United States Patent Office 3,637,854
Patented Jan. 25, 1972

3,637,854
1-HALO - 5 - (3-N-HYDROXY-N-METHYL-AMINO-PROPYL OR PROPYLIDENE) - 5H-DIBENZO[a,d] CYCLOHEPTENES AND THE SALTS THEREOF
Emilio Kyburz, Reinach, and Hans Spiegelberg, Basel, Switzerland, assignors to Hoffmann-La Roche Inc., Nutley, N.J.
No Drawing. Filed Mar. 12, 1969, Ser. No. 806,699
Claims priority, application Switzerland, Mar. 20, 1968, 4,203/68
Int. Cl. C07c 87/28
U.S. Cl. 260—570.8 TC                    15 Claims

ABSTRACT OF THE DISCLOSURE 1-halo-5-(3-N-hydroxy-N-methylaminopropyl or propylidene)-5H-dibenzo[a,d]cycloheptenes, prepared, inter alia, by the oxidation of the corresponding dehydroxy cycloheptene, are described. The end products are useful as antidepressants.

BRIEF SUMMARY OF THE INVENTION

The invention relates to tricyclic compounds of the formulas

[Formula Ia]

and

[Formula Ib]

wherein R is chlorine or fluorine; $R_1$ and $R_2$ are hydrogen, chlorine or fluorine; and X is ethylene, vinylene, or vinylene substituted by chlorine or bromine, as well as their isomers and pharmaceutically acceptable acid addition salts. The compounds of Formulas Ia and Ib are useful antidepressant agents.

In another aspect, the invention relates to novel intermediates.

DETAILED DESCRIPTION OF THE INVENTION

The invention relates to tricyclic compounds of the formulas

[Formula Ia]

and

[Formula Ib]

wherein R is chlorine or fluorine; $R_1$ and $R_2$ are hydrogen, chlorine or fluorine and X is ethylene, vinylene, or vinylene substituted by chlorine or bromine, as well as their isomers and pharmaceutically acceptable acid addition salts.

In Formulas Ia and Ib, R preferably is chlorine. Representatives of compounds of Formulas Ia and Ib are, for example:

1-chloro-10,11-dihydro-5-(3-N-hydroxy-N-methylaminopropylidene)-5H-dibenzo[a,d]cycloheptene;
1-chloro-10,11-dihydro-5-(3-N-hydroxy-N-methylaminopropyl)-5H-dibenzo[a,d]cycloheptene;
1-chloro-5-(3-N-hydroxy-N-methylaminopropylidene)-5H-dibenzo[a,d]cycloheptene;
1-chloro-5-(3-N-hydroxy-N-methylaminopropyl)-5H-dibenzo[a,d]cycloheptene,
and the like.

A process of the invention for preparing the tricyclic compounds of Formula Ia or Ib as well as of their isomers and pharmaceutically acceptable acid addition salts comprises oxidizing the corresponding compound of the formula

[Formula IIa]    or    [Formula IIb]

wherein R, $R_1$, $R_2$ and X are as previously described.

Another process comprises dehydrating a compound of the formula

[Formula III]

wherein R, $R_1$, $R_2$ and X are as previously described and one of the symbols $Y_1$ and $Y_2$ is hydrogen and the other is hydroxyl or an acid addition salt thereof.

Still another process comprises reacting a compound of the formula

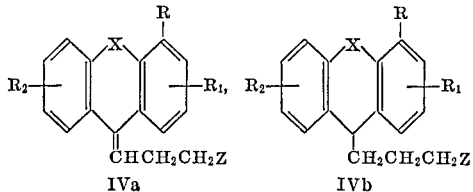
IVa        IVb

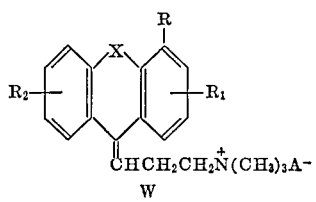

or

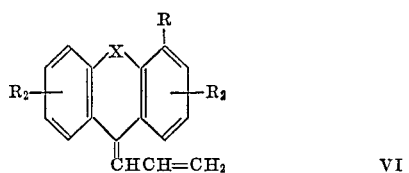
VI wherein R, $R_1$, $R_2$ and X are as previously described; Z is halogen or a substituted sulfonyloxy residue and A is the anion of an acid, with methylhydroxylamine.

A still further process comprises saponifying a compound of the formula

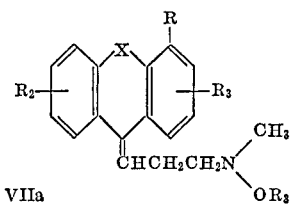
VIIa or

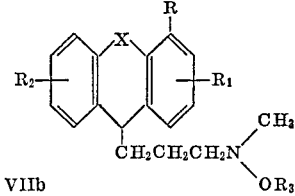
VIIb wherein R, $R_1$, $R_2$ and X are as previously described and $R_3$ is lower alkanoyl, benzoyl or substituted benzoyl.

In the aforementioned processes, in any desired sequence, the isomers are isolated from the isomer mixture obtained, if desired, and a base obtained is converted into a pharmaceutically acceptable acid addition salt, if desired.

According to a preferred process embodiment of the invention, a secondary amine of Formula IIa or IIb is oxidized. As the oxidizing agent, there can be utilized organic peroxides, for example, monosubstituted organic peroxides such as $C_1$-$C_4$ alkyl or alkanoyl hydroperoxides, examples of where are t. butyl hydroperoxide, performic acid, peracetic acid, and the like; phenyl-substituted derivatives of these hydroperoxides, such as, cumol hydroperoxide, perbenzoic acid, and the like. The phenyl substituent can be substituted, if desired, with for example, $C_1$-$C_4$ alkyl or alkoxy, halogen or carboxy exemplary of such compounds are 4-methylperbenzoic acid, 4-methoxy-perbenzoic acid, 3-chloroperbenzoic acid, monoperphthalic acid, and the like. Inorganic oxidizing agents can also be used, for example, hydrogen peroxide; ozone; hypochlorites such as sodium, potassium or ammonium hypochlorite; peroxymono- or peroxydisulfuric acid. The use of hydrogen peroxide is preferred. Advantageously, the oxidation is effected in a solvent such as, for example, methanol, ethanol, ether, benzene or chloroform, at a temperature in the range of between about —50° C. and +100° C. After a conventional working up, with removal of the excess oxidizing agent, there is obtained the corresponding hydroxylamine of Formula Ia or Ib.

The secondary amine of Formula IIa or IIb employed in the above reaction can,, for example, be prepared in a known manner by reacting the corresponding tricyclic 5-ketone with suitable Grignard compounds. The tricyclic 5-ketones can be prepared according to methods which are known. However, it is to be noted that the introduction of a halogen into the 10(or 11)-position of the 1-chloro(or fluoro)-5H-dibenzo[a,d]cyclohepten-5-one is preferably effected by addition of the corresponing halogen with simultaneous irradiation. After the addition of alkali, the resulting 1 - chloro(or fluoro)-10,11-dihalo-10,11-dihydro-10,11-dihydro - 5H - dibenzo[a,d]cyclohepten-5-one splits off a molecule of hydrogen halide whereby a 1-chloro(or fluoro)-10(or 11)-halo-5H-dibenzo[a,d]cyclohepten-5-one is formed.

A very suitable method for the preparation of the starting amine of Formula IIa or IIb comprises the reaction of the corresponding tricyclic 5-ketone with a methoxy-propyl magnesium halide. The addition product thus obtained is hydrolyzed, e.g., with aqueous ammonium chloride solution. The 5-methoxypropyl-5-carbinol formed is then dehydrated, for example, with an alkanolic mineral acid such as methanolic hydrochloric acid, whereby the corresponding 5 - methoxypropylidene compound is formed. This reaction product is subsequently halogenated, for example, by treatment with boron trichloride, phosphorus oxychloride, hydrogen bromide, or the like, whereby the corresponding 5-halopropylidene compound is formed. The 5-methoxy-5-carbinol obtained above can also be converted into the corresponding 5-iodopropyl compound by the action of hydroiodic acid and red phosphorus. The corresponding 5-halopropylidene or 5-iodo-propyl compound obtained in the manner described above can then be treated with excess methylamine, preferably in a closed vessel at elevated temperature and in a solvent, whereby a secondary starting amine of Formula IIa or IIb is obtained.

According to a further process embodiment of the invention, a carbinol of the Formula III herein is dehydrated. Preferred starting substances are compounds of Formula III wherein $Y_1$ is hydroxyl and $Y_2$ is hydrogen.

The dehydration of compounds of Formula III leads to compounds of Formula Ia having an exocyclic double bond in the 5-position. Conveniently, the dehydration is carried out using mineral acids such as hydrochloric or hydrobromic acid, in which case one can work in anhydrous or aqueous medium. The dehydration is preferably carried out in ethanolic hydrochloric acid at a temperature in the range of between room temperature and the boiling point of the reaction mixture. However, it also proceeds by heating, for example, at 50° C. to reflux temperature, preferably at reflux temperature, with a high-boiling anhydrous solvent such as dimethyl sulfoxide. Other usual dehydrating agents can also be employed, for example, sulfuric acid, phosphorus oxychloride, zinc chloride or potassium bisulfate, for example, in an inert organic solvent, such as chloroform or methylene chloride, at a temperature in the range of between room temperature and the boiling point of the reaction mixture.

Starting carbinols of Formula III wherein $Y_1$ is hydroxyl and $Y_2$ is hydrogen are conveniently obtained as follows:

The corresponding tricyclic 5-ketone is reacted with a methylbenzylaminopropyl magnesium halide. After hydrolysis of the resulting addition product, for example, with saturated ammonium chloride solution, the 5-carbinol obtained is reacted with ethyl chloroformate. Then, the 5-hydroxy-5-[3-(methylcarbethoxy-amino)-propyl] compound obtained is alkali hydrolyzed with an alkali, for example, by boiling with aqueous potassium hydroxide solution, whereby a decarboxylation occurs and the corresponding 5-hydroxy-5-(3-methylaminopropyl) compound is formed. This is subsequently treated with one of the oxidizing agents mentioned above, for example, with hydrogen peroxide in a solvent such as methanol, ethanol, ether, benzene or chloroform at about room temperature. After decomposition of the excess hydrogen peroxide with, for example, platinum black, the desired starting carbinol of Formula III wherein $Y_1$ is hydroxyl and $Y_2$ is hydrogen can be recovered after evaporation of the solvent. The product can sometimes be crystallized by vigorous stirring, for example, at a temperature in the range of between about —20° C. and 0° C., and subsequently recovered by simple filtration and rinsing.

Starting carbinols of Formula III wherein, on the other hand, $Y_1$ is hydrogen and $Y_2$ is hydroxyl are obtained, for example, by reacting a corresponding tricyclic 5-ketone with ethyl magnesium bromide and hydrolyzing the reaction product. The resulting 5-hydroxy-5-ethyl compound is dehydrated with acetyl chloride and subsequently treated with formic acid and hydrogen peroxide. The resulting 5 - hydroxy - 5 - (1 - hydroxyethyl) compound is dehydrated to the corresponding 5-acetyl compound with aqueous sulfuric acid. By treatment with formaldehyde and methylamine hydrochloride, there is obtained a 5-methylaminopropionyl compound which is converted to the corresponding carbinol by reduction with sodium borohydride. The reduction product is subsequently oxidized as described above for the preparation of the carbinols of Formula III in which $Y_1$ is hydroxyl and $Y_2$ is hydrogen.

A further embodiment of a process of the invention comprises treating a compound of the Formula IVa, IVb, V or VI with methylhydroxylamine.

In the above Formula IVa or IVb, Z preferably is a chlorine or bromine atom. When Z is substituted sulfonyloxy, preferably it is a lower alkylsulfonyloxy residue such as mesyloxy; phenylsulfonyloxy; lower alkylphenylsulfonyloxy residue such as tosyloxy; or phenyl-(lower alkyl)sulfonyloxy residue such as phenylmesyloxy. The anion A of Formula V is preferably derived from an inorganic acid such as hydrochloric acid, hydrobromic acid, hydroiodic acid, sulfuric acid, or the like.

The reaction of compounds of Formulas IVa, IVb, V and VI with methylhydroxylamine is preferably carried out in the presence of an excess of methylhydroxylamine. Conveniently, the reaction can be conducted in the presence of a basic catalyst, for example, potassium carbonate, sodium amide, potassium amide or the like. The reaction can be effected in an organic solvent such as methanol, ethanol, acetone, benzene or toluene. While the reaction temperature is not critical, it advantageously can be in the range of between 0° C. and the boiling point of the reaction mixture.

The starting compound of Formula IVa or IVb may, for example, be obtained by reaction of the corresponding tricyclic 5-ketone with a methoxypropyl magnesium halide, with subsequent hydrolysis, reduction or dehydration of the resulting carbinol and treatment of the resulting product with an excess of a hydrohalic acid, for example, hydrobromic acid, to form the corresponding halopropyl (idene) compound of Formula IVa or IVb. If the methoxy-propyl(idene) compound is treated with dilute hydrohalic acid, the corresponding hydroxypropyl(idene) compound can be obtained. The latter can be reacted with a substituted sulfonyl halide, for example, the chloride, to form a correspondingly substituted sulfonyloxypropyl (idene) compound of Formula IVa or IVb.

The quaternary salt of Formula V, also employable as the staring material, can be obtained by quaternization of the corresponding dimethylamino compound with a methylating agent such as methyl chloride, methyl bromide, methyl iodide or dimethyl sulfate. The starting compound of Formula VI is obtainable, for example, by reaction of an allyl Grignard compound with the corresponding tricyclic 5-ketone and subsequent hydrolysis and dehydration.

According to a further embodiment of a process of the invention, a compound for Formula VIIa or VIIb is saponified. In Formula VIIa or VIIb, $R_3$ preferably is a $C_1$–$C_4$ alkanoyl, for example, acetyl, propionyl or isobutyryl, or, especially, benzoyl. The latter can be substituted for example, by $C_1$–$C_4$ alkyl, $C_1$–$C_4$ alkoxy, halo or carboxy.

As the saponification agents there can be preferably employed basic agents such as, for example, alkali hydroxides in a lower alkanol, for example, ethanolic caustic potash, methanolic caustic soda and the like. Alkali alcoholates such as sodium methylate, can also be employed. While the temperature is not critical, it is conveniently in the range of between room temperature and the boiling point of the reaction mixture.

The starting compounds of Formula VIIa or VIIb can, for example, be obtained by treating a compound of Formula IIa or IIb, respectively, at about 0° C. with benzoyl peroxide, acetyl peroxide or acetyl benzoyl peroxide. Advantageously, the reaction is effected in an organic solvent such as ether or chloroform.

The methods given above for the preparation of starting compounds of Formulas IIa, b–VIIa, b are only exemplary. Self-evidently, other methods which are obvious to one skilled in the art can also be utilized. For example, Example 2 hereinafter illustrates another route to the starting compounds of Formula IIa or IIb.

Compounds of Formulas Ia and Ib which have an exocyclic double bond and/or a double bond in the 10,11-position, and their salts, can be separated into their geometric isomers, i.e., α- and β-isomers. The methods of separation are known in the art. Preferably, the geometric isomers are separated by fractional crystallization of the acid addition salts from a solvent, for example, acetone or from a solvent mixture, for example, methanol/diethyl ether.

Compounds of Formula Ia and Ib obtained and their salts exist as racemates. A racemate can be separated into its optical isomers in a known manner, for example, by reaction with optically active acids such as tartaric acid or camphorsulfonic acid and subsequent crystallization.

The separation of the geometric and/or optical isomers can be undertaken at an intermediate product stage, so that in this manner the process in accordance with the invention is carried out with geometrically or optically uniform starting materials for Formulas IIa, b–VIIa, b.

The compounds of Formula Ia and Ib have basic character and can be converted into their pharmaceutically acceptable acid addition salts. Such salts comprise, for example, those with organic acids such as oxalic acid, citric acid, acetic acid, lactic acid, maleic acid and tartaric acid, or with inorganic acids such as hydrochloric acid, hydrobromic acid or sulfuric acid.

As previously mentioned, the compounds of Formulas Ia and Ib possess excellent antidepressive action and are therefore useful antidepressants. To demonstrate the antidepressant activity in warm-blooded animals, a compound of Formula Ia or Ib, as the test compound, in the doses set out hereinafter, was injected subcutaneously to groups of 10 mice each. Sixteen hours later, the animals received 5 mg./kg. of 2-hydroxy-2-ethyl - 3 - isobutyl-9,10-dimethoxy - 1,2,3,4,6,7 - hexahydro-11bH-benzo[a]quinolizine hydrochloride (substance A) injected subcutaneously. The same dosage was administered to a control group of 10 nonpretreated mice. After 30 minutes, ethanol in a dosage of 3.75 g./kg. was administered intraperitoneally to all animals, as well as to the control group of 10 mice.

The average duration of sleep was determined in each group of mice. The percentage reduction of the duration of sleep compared to the ethanol-sleep potentiated by substance A served as a measure of antidepressive action. The greater the decrease of the duration of sleep, the greater is the antidepressant activity.

When 20 mg./kg. s.c. of 1-chloro-10,11-dihydro-5-(3-N-hydroxy-N-methyl-aminopropylidene) - 5H - dibenzo-[a,d]cycloheptene are utilized in accordance with the procedure set forth above, a corresponding decrease in the duration of sleep of 61 percent is observed. A corresponding dosage of amitriptyline showed a far smaller reduction of the duration of sleep.

The low toxicity of the compounds of Formulas Ia and Ib is exemplified by the acute toxicity of 1-chloro-10,11-dihydro - 5 - (3-N-hydroxy-N-methylaminopropylidene) - 5H - dibenzo[a,d]cycloheptene demonstrated in mice (24-hour values):

$LD_{50}$, p.o. $>$ 500 mg./kg.

The compounds of Formula Ia and Ib can be used as medicaments, for example, in the form of pharmactutical preparations which can contain them or their salts in admixture with a pharmaceutically inert carrier suitable for enteral, for example, oral, or parenteral application. Such carriers comprise organic or inorganic substances, such as, for example, water, gelatin, lactose, starches, magnesium stearate, talc, vegetable oils, gum arabic, polyalkyleneglycols, and the like. The pharmaceutical preparations can be in solid form, for example, as tablets, dragees, suppositories, capsules, or in liquid form, for example, as solutions, suspensions or emulsions. They may be sterilized and/or contain additives such as preserving, stabilizing, wetting or emulsifying agents, salts for varying the osmotic pressure or buffers. They can also contain yet other therapeutically valuable substances.

Convenient pharmaceutical dosage forms contain from about 1 to 200 mg. of a compound of Formula Ia or Ib. Convenient oral dosages are in the range of about 0.1 mg./kg. per day to about 5 mg./kg. per day. However, the aforementioned ranges are exemplary and can be varied upwards or downwards, depending on the requirements of the warm-blooded animal being treated.

The following examples further illustrate the invention. All temperatures are in degrees centigrade, unless otherwise mentioned.

EXAMPLE 1

Preparation of 1-chloro-10,11-dihydro-5-(3-N-hydroxy-N-methyl-aminopropylidene)-5H-dibenzo[a,d]cycloheptene 10 g. of 1-chloro-10,11-dihydro - 5 - (3-N-benzoyloxy-N-methyl-aminopropylidene) - 5H - dibenzo[a,d]cycloheptene are heated under reflux conditions with 150 ml. of ethanol and a solution containing 2 g. of potassium hydroxide in 20 ml. of water for an hour. After cooling, the reaction mixture is filtered and the filtrate is evaporated under reduced pressure. The residue is taken up in ether and the ethereal solution is shaken with dilute hydrochloric acid. The acidic extracts are made alkaline with concentrated ammonia solution, extracted with ether, dried and evaporated to yield 1-chloro-10,11-dihydro-5-)3-N-hydroxy-N-methyl-aminopropylidene) - 5H - dibenzo[a,d] cycloheptene having a melting point of 109°–112° C. after recrystallization from benzene/petroleum ether. The compound comprises a mixture of the geometric isomers in the ratio of about 1:2. The product can be converted to the corresponding hydrochloride by treatment with ethanolic or ethereal hydrochloric acid.

The 1 - chloro-10,11-dihydro-5-(3-N-benzoloxy-N-methyl-aminopropylidene) - 5H - dibenzo[a,d]cycloheptene employed as the starting material can be prepared as follows:

To 14 g. of Gilman alloy in 100 ml. of absolute ether, after the addition of a trace of iodine or methyl iodide, there is added dropwise under reflux conditions over a period of about 30 minutes a solution containing 45.6 g. of 1-chloro-3-methoxypropane in 300 ml. of absolute ether. The reaction mixture is heated for an additional 3 hours. After cooling to 20° C., a solution containing 48.5 g. of 1-chloro-10,11-dihydro - 5H - dibenzo[a,d]cyclohepten-5-one in 160 ml. of tetrahydrofuran is added over a period of 30 minutes and subsequently heated under reflux conditions for 12 hours. Then, the reaction mixture is hydrolyzed, with cooling, with 150 ml. of saturated ammonium chloride solution, filtered, rinsed with chloroform, dried with sodium sulfate and evaporated to yield crude 1-chloro-10,11-dihydro - 5 - (3-methoxypropyl)-5-hydroxy-5H-dibenzo[a,d]cycloheptene having a melting point of 80°–81° C. after recrystallization from ether/petroleum ether.

53.3 g. of 1-chloro-10,11-dihydro - 5 - (3-methoxypropyl)-5-hydroxy - 5H - dibenzo[a,d]cycloheptene in 250 ml. of methanol and 53 ml. of 30 percent methanolic hydrochloric acid are heated under reflux conditions for 1 hour. Thereafter, the reaction mixture is evaporated under reduced pressure, taken up in ether, washed with water, dried with sodium sulfate and again evaporated to yield 1 - chloro-10,11-dihydro-5-(3-methoxypropylidene)-5H-dibenzo[a,d]cycloheptene as a yellow oil.

48.5 g. of 1-chloro-10,11-dihydro - 5 - (3-methoxypropylidene)-5H-dibenzo[a,d]cycloheptene are dissolved in 150 ml. of methylene chloride, cooled to 10° C. and treated over a period of 15 minutes with a solution containing 30 g. of boron trichloride in 150 ml. of methylene chloride. The reaction mixture is stirred at room temperature for an additional 19 hours. Then, it is poured onto ice-water, extracted with methylene chloride, washed with water and dried over sodium sulfate. After evaporation, there is obtained 1-chloro-10,11-dihydro - 5 - (3-chloropropylidene) - 5H - dibenzo[a,d]cycloheptene as a yellow-orange oil which slowly crystallizes out and has a melting point of 51°–53° C.

A mixture comprising 20 g. of 1-chloro-10,11-dihydro-5-(3-chloropropylidene) - 5H - dibenzo[a,d]cycloheptene, 80 ml. of absolute methanol and 30 g. of methylamine is heated at 120° C. for 12 hours in an autoclave under a nitrogen pressure of 6 atmospheres. Subsequently, the solution is evaporated under reduced pressure and the residual yellow oil is treated with methanolic hydrochloric acid, whereby 1-chloro-10,11-dihydro-5-(3-methylaminopropylidene) - 5H - dibenzo[a,d]cycloheptene hydrochloride precipitates. After recrystallization from methanol/ether, the compound has a melting point of 209°–210° C. and comprises a mixture of the α- and β-isomers in the ratio of about 3:2.

The free base is recovered from the 1-chloro-10,11-dihydro - 5 - (3-methylaminopropylidene) - 5H - dibenzo[a,d]cycloheptene hydrochloride by neutralization with aqueous sodium hydroxide solution. The free base is dissolved in 300 ml. of ether and treated dropwise over a period of 45 minutes at —5° C. with a solution containing 6.65 g. of benzoyl peroxide in 90 ml. of ether and 30 ml. of chloroform. Then, the mixture is stirred at —5° to 0° C. for 3 hours, whereby a precipitate gradually forms. The precipitate is removed by filtration and washed with ether. The ethereal solution is washed with dilute hydrochloric acid, sodium bicarbonate solution and water, respectively, dried over sodium sulfate and evaporated to yield oily 1-chloro - 10,11 - dihydro-5-(3-N-benzoloxy-N-methylaminopropylidene) - 5H - dibenzo[a,d]cycloheptene as the residue.

EXAMPLE 2

Preparation of 1-chloro-10,11-dihydro-5-(3-N-hydroxy-N-methyl-aminopropyl)-5H-dibenzo[a,d]cycloheptene Utilizing the procedure of Example 1, when 1-chloro-10,11-dihydro-5-(3-N-benzoyloxy - N - methylaminopropyl) - 5H - dibenzo[a,d]cycloheptene is used in place of 1-chloro-10,11-dihydro - 5 - (3-N-benzoyloxy - N - methylaminopropylidene)-5H-dibenzo[a,d]cycloheptene, there is obtained 1-chloro-10,11-dihydro - 5 - (3-N-hydroxy-N-methylaminopropyl) - 5H - dibenzo[a,d]cycloheptene as an amorphous powder having a melting point of <60° C. The compound can be converted into the corresponding hydrochloride salt by treatment with ethanolic or ethereal hydrochloric acid.

The 1 - chloro - 10,11 - dihydro - 5 - (3 - N - benzoyloxy - N - methyl - aminopropyl) - 5H - dibenzo[a,d]cycloheptene employed as the starting material can be prepared as follows:

86.6 g. of Gilman alloy or magnesium turnings are heated under reflux conditions in 800 ml. of absolute ether with a trace of iodine. A solution containing 390 g. of dimethyl-aminopropyl chloride in 500 ml. of absolute tetrahydrofuran is subsequently added dropwise over a period of 2 hours. The mixture is heated under reflux conditions for an additional 3 hours. To the resulting suspension there is added a solution containing 242.7 g. of 1 - chloro - 10,11 - dihydro - 5H - dibenzo[a,d]cyclohepten-5-one in 500 ml. of absolute tetrahydrofuran dropwise over a period of 15 minutes, cooled to 15° C. and the mixture is heated under reflux conditions for an additional 12 hours. The reaction mixture is subsequently cooled to 15° C., hydrolyzed with 500 ml. of saturated ammonium chloride solution, filtered and rinsed with methylene chloride. The filtrate is dried with sodium sulfate and evaporated under reduced pressure. The residual yellow crude material is recrystallized from 6000 ml. of high-boiling petroleum ether to yield 1 - chloro-10,11 - dihydro - 5 - (3 - dimethylaminopropyl) - 5 - hydroxy-5H-dibenzo[a,d]cycloheptene having a melting point of 131°-132° C.

500 g. of 1 - chloro - 10,11 - dihydro - 5 - (3 - dimethylaminopropyl) - 5 - hydroxy - 5H - dibenzo[a,d]cycloheptene, 437 g. of red phosphorus, 4000 ml. of glacial acetic and 2160 ml. of 57 percent hydroiodic acid are heated under reflux conditions for 3 hours in an argon atmosphere. The suspension is filtered, the filtrate is treated with 2000 ml. of boiling water and subsequently cooled to 20° C. The crystals which separate out are separated by decantation and the mother liquor is concentrated under reduced pressure. The combined residues are suspended in 15,000 ml. of water, cooled with ice and, with stirring, adjusted to pH 10–12 with concentrated caustic soda. The solution is extracted with 4000 ml. of methylene chloride. The organic phase is successively washed with saturated sodium chloride solution and sodium thiosulfate solution, dried with sodium sulfate and evaporated under reduced pressure. The residue is dissolved in 2000 ml. of ether, filtered from insoluble portions and again evaporated to yield yellow, oily 1-chloro - 10,11 - dihydro - 5 - (3 - dimethylaminopropyl)-5H - dibenzo[a,d]cycloheptene. The hydrochloride of this compound crystallizes from acetone/ether and has a melting point of 149°-153° C.

A solution containing 102.5 g. of 1 - chloro - 10,11-dihydro - 5 - (3 - dimethylaminopropyl) - 5H - dibenzo[a,d]cycloheptene in 500 ml. of methylene chloride is added dropwise to a solution containing 55 g. of cyanogen bromide in 500 ml. of methylene chloride. The resulting reaction mixture is stirred at room temperature for 12 hours, subsequently poured onto ice-water. The methylene chloride phase is washed with 2-N hydrochloric acid and water, dried with sodium sulfate and evaporated under reduced pressure. The residue, a yellow oil, is crystallized from ether, to yield 1 - chloro - 10,11-dihydro - 5 - (3 - N - cyano - N - methyl - aminopropyl)-5H - dibenzo[a,d]cycloheptene having a melting point of 69°-71° C. After re-solution in benzene/ether, this compound can be further purified chromatographically on 500 g. of silica gel.

A mixture comprising 650 g. of 1 - chloro - 10,11-dihydro - 5 - (3-N-cyano-N-methyl-aminopropyl)-5H-dibenzo[a,d]cycloheptene, 4000 ml. of glacial acetic acid, 2000 ml. of water and 1000 ml. of concentrated hydrochloric acid are heated under reflux conditions for 24 hours. Thereafter, the reaction mixture is concentrated under reduced pressure, diluted with 20000 ml. of ice-cold water, washed with 5000 ml. of methylene chloride, made alkaline with concentrated caustic soda and the resulting precipitate is taken up in methylene chloride. Upon concentration of the methylene chloride solution, there is obtained a brown-red oil which, by addition of methanolic hydrochloric acid, is converted into crystalline 1 - chloro - 10,11 - dihydro - 5 - (3 - methyl - aminopropyl) - 5H - dibenzo[a,d]cycloheptene hydrochloride, having a melting point of 168°-169° C. after recrystallization from methanol/ether. The free base is obtained from the hydrochloride by neutralization with sodium hydroxide solution.

The 1 chloro - 10,11 - dihydro - 5 - (3 - methylaminopropyl) - 5H - dibenzo[a,d]cycloheptene obtained above is treated with benzoyl peroxide according to the procedure set forth in Example 1, to yield 1 - chloro - 10,11-dihydro - 5 - (3 - N - benzoyloxy - N - methylaminopropyl)-5H-dibenzo[a,d]cycloheptene.

EXAMPLE 3

16 g. of 1 - chloro - 10,11 - dihydro - 5 - (3 - N - benzoyloxy - N - methyl - aminopropyl) - 5H - dibenzo[a,d]cycloheptene are dissolved in 100 ml. of ethanol and, after the addition of a solution of 2.6 g. of potassium hydroxide, 10 ml. of water and 70 ml. of ethanol, boiled 1 hour under reflux conditions. The reaction mixture is evaporated under reduced pressure, diluted with water and extracted with ether. The ethereal solution is washed with water, dried over sodium sulphate and evaporated. The residue is taken up in ethanol and water is added until a haze forms. 1 - chloro - 10,11 - dihydro - 5 - (3-N - hydroxy - N - methylaminopropyl) - 5H - dibenzo[a,d]cycloheptene crystallises upon standing. The product melts at 104–105° C. After treatment with methanolic hydrochloric acid, this compound converts into a hydroscopic hydrochloride melting at 88–99° C. (dec.).

EXAMPLE 4

Preparation of tablets

|  | G. |
|---|---|
| 1 - chloro - 10,11 -dihydro - 5 - (3 - N - hydroxy - N - methyl - aminopropylidene) - 5H-dibenzo[a,d]cycloheptene | 28.05 |
| Lactose | 110 |
| Corn starch | 57.95 |
| Talcum | 3.40 |
| Magnesium stearate | 0.6 |
|  | 200.00 |

The ingredients are intimately mixed with one another, pressed into 200 mg. tablets and, subsequently, coated with ethyl cellulose and Carbowax.

We claim:
1. A compound selected from the group consisting of compounds of the formulas

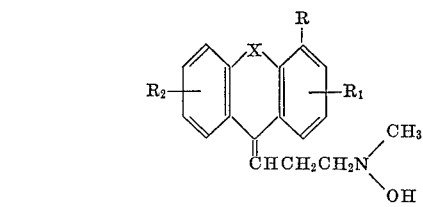

and

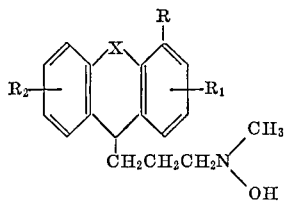

wherein R is chlorine or fluorine; $R_1$ and $R_2$ are hydrogen; and X is ethylene or vinylene, and their pharmaceutically acceptable acid addition salts.

2. A compound in accordance with claim 1 of the formula

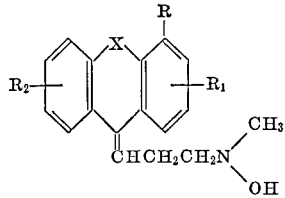

wherein R is chlorine or fluorine; $R_1$ and $R_2$ are hydrogen; and X is ethylene or vinylene, and their pharmaceutically acceptable acid addition salts.

3. A compound in accordance with claim 2, wherein X is ethylene.

4. A compound in accordance with claim 3, 1-chloro-10,11-dihydro - 5 - (3-N-hydroxy-N-methylaminopropylidene)-5H-dibenzo[a,d]cycloheptene.

5. A compound in accordance with claim 1 of the formula

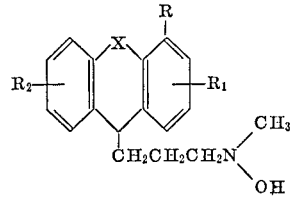

wherein R is chlorine or fluorine; $R_1$ and $R_2$ are hydrogen; and X is ethylene or vinylene, and their pharmaceutically acceptable acid addition salts.

6. A compound in accordance with claim 5, wherein X is ethylene.

7. A compound in accordance with claim 6, 1-chloro-10,11-dihydro - 5 - (3-N-hydroxy-N-methylaminopropyl)-5H-dibenzo[a,d]cycloheptene.

8. A compound selected from the group consisting of compounds of the formulas

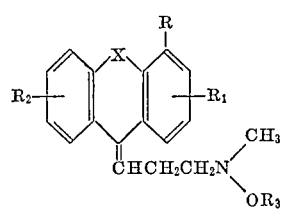

and

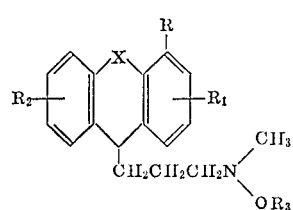

wherein R is chlorine or fluorine; $R_1$ and $R_2$ are hydrogen; X is ethylene or vinylene; and $R_3$ is lower alkanoyl or benzoyl.

9. A compound in accordance with claim 8 of the formula

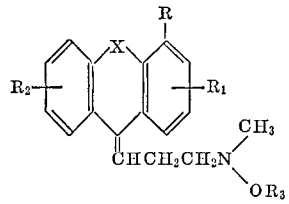

wherein R is chlorine or fluorine; $R_1$ and $R_2$ are hydrogen; X is ethylene or vinylene, and $R_3$ is lower alkanoyl or benzoyl.

10. A compound in accordance with claim 9, wherein X is ethylene.

11. A compound in accordance with claim 10, 1-chloro-10,11 - dihydro - 5 - (3-N-benzoyloxy-N-methylaminopropylidene)-5H-dibenzo[a,d]cycloheptene.

12. A compound in accordance with claim 8 of the formula

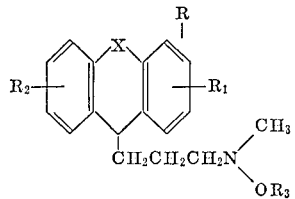

wherein R is chlorine or fluorine; $R_1$ and $R_2$ are hydrogen; X is ethylene or vinylene; and $R_3$ is lower alkanoyl or benzoyl.

13. A compound in accordance with claim 12, wherein X is ethylene.

14. A compound in accordance with claim 13, 1-chloro-10,11 - dihydro - 5 - (3-N-benzoyloxy-N-methylaminopropyl)-5H-dibenzo[a,d]cycloheptene.

15. A compound of the formula

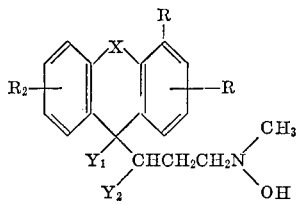

wherein R is chlorine or fluorine; $R_1$ and $R_2$ are hydrogen; X is ethylene or vinylene; and one of the symbols $Y_1$ and $Y_2$ is hydrogen and the other is hydroxyl.

References Cited

UNITED STATES PATENTS 3,358,026　12/1967　Schroter et al. _____ 260—570.8
3,372,196　 3/1968　Engelhardt _____ 260—570.8

ROBERT V. HINES, Primary Examiner

U.S. Cl. X.R.

260—456 (R), 456 (P), 471 (A), 501.18, 501.19, 551 (C), 567.6 (M), 570.5 (C), 570.6, 592, 618 (R), 618 (D), 649 (R); 424—330